July 7, 1959
C. C. SCHUETZ ET AL
2,893,889
INTUMESCENT FIRE-RETARDING BITUMINOUS COATING
COMPOSITION AND ROOFING MADE THEREFROM
Filed April 2, 1956
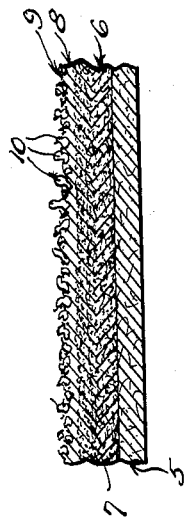
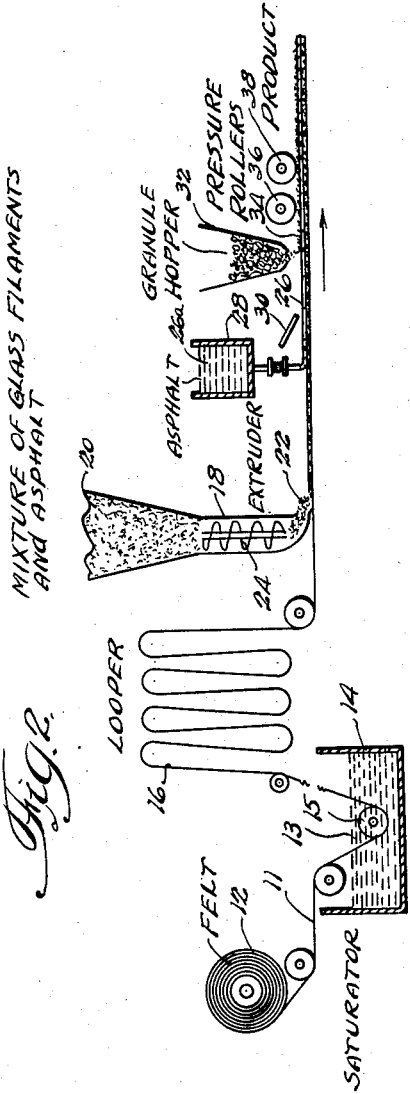
INVENTORS.
Clyde C. Schuetz &
BY Richard Ericson.

United States Patent Office 2,893,889
Patented July 7, 1959

2,893,889
INTUMESCENT FIRE-RETARDING BITUMINOUS COATING COMPOSITION AND ROOFING MADE THEREFROM

Clyde C. Schuetz, Prospect Heights, and Richard Ericson, Park Ridge, Ill., assignors to United States Gypsum Company, Chicago, Ill., a corporation of Illinois Application April 2, 1956, Serial No. 575,476

6 Claims. (Cl. 117—30)

This invention relates to roofing and siding materials and coating compositions suitable for use in preparing building materials of this type. More particularly, this invention relates to coating compositions and roofing and siding material prepared therefrom which have greatly enhanced fire resistance, and is a continuation-in-part of our copending application Serial No. 356,772, filed May 22, 1953, now abandoned.

For many years wood shingles were widely used as roofing materials. The widely recognized disadvantage of wood shingles, however, is their extreme flammability. Their extensive use continued for a number of years, however, since slate and tile, the only fire-resistant shingles on the market in early times, were expensive and very heavy. A number of years ago, however, the so-called composition shingles were introduced to the market. These are prepared by impregnating a suitable felt with a bituminous saturant, applying to one surface of the saturated felt a coating of asphalt which may or may not have an added mineral filler, and thereafter embedding mineral granules in the asphalt coating. With the introduction of composition shingles of this character, the use of wood shingles has rapidly diminished and, in fact, today wood shingles are prohibited by ordinance in many cities. The above-referred-to composition shingles are today competitive with wood shingles in cost and offer very definite advantages in fire protection over wood shingles. It has been appreciated, however, that prior art composition shingles of this general character, despite the superiority to wood, have only a limited resistance to fire.

A rating system has been devised by Underwriters' Laboratories, Inc., to classify various roofing materials as to fire resistance when laid under conditions simulating actual use in the field for the particular roofing material being tested. This rating system and test methods employed are set forth in Underwriters' Laboratories Subject 55, dated August 7, 1945. This devised system comprises flame exposure tests, spread of flame tests and burning brand tests. The classification given a roof covering upon being subjected to these tests depends not only upon the manner in which the covering is applied to the roof and the nature of the roof support, but also upon the nature of the roofing material itself. Wood shingles, when laid in courses on a roof, will ordinarily receive no rating whatsoever in the test system devised, while the usual prior art composition asphalt shingles, when laid in the customary manner, will generally rate in Class C. It is recognized in the roofing art that it is desirable to provide roof coverings having increased fire resistance which, when applied, will have a rating higher than Class C, that is, Class B, or even Class A.

Accordingly, it is one object of this invention to prepare a bituminous coating material having enhanced fire-resistant qualities when tested under comparable conditions with prior art material of the same general character.

It is another object of this invention to provide a coating material containing small quantities of drawn glass fibers which effect unexpected fire-resisting properties in the coating material in which disposed.

It is a still further object of this invention to prepare fire-retardant, weather-resistant covering material by a cheap and simple process from readily available substances.

A still further object of this invention is the provision of a coating composition which is particularly adaptable for use on roofs and in the preparation of fire-retardant shingles and siding.

A still further object of this invention is the provision of a process for preparing fire-retardant coating compositions and roofing and siding of the character indicated above.

An additional object of this invention is to provide a bituminous composition characterized by enhanced fire resistance, ease of application and stability over long periods of time to weathering conditions on all types of roof constructions.

Another object of the present invention is to produce a coating composition applicable to an inherently combustible base sheet material so as to form therewith a relatively fire-resistant building covering material such as shingles and siding, and which contains imbedded in the first-to-be applied asphalt coating layer a mass of interfelted glass filaments so that if such a material be subjected to fire this interfelted mass will act as a supporting skeleton for the asphalt and also both during and after the completion of the combustion of the asphalt will remain as a protective sheath whereby to retard penetration of the fire to underlying strata of the roofing structure.

Still a further object of the invention is to produce a building covering material, particularly roofing and siding, which will withstand the effects of fire brands and flame to a much higher extent than has previously been possible, and to accomplish this with a minimum amount of material and at a relatively low cost.

Further and additional objects of the present invention will become apparent from the further description hereinbelow and the appended claims.

For purposes of illustrating the invention there is filed concurrently herewith a drawing in which:

Figure 1 is a cross section of a portion of the finished product of the present invention shown on a greatly exaggerated scale; and Fig. 2 is a schematic representation of apparatus adapted to produce the composition disclosed in the present invention.

On these drawings suitable legends have been applied for a more ready comprehension and understanding of the invention.

The present invention is definitely to be differentiated from processes and products of a somewhat similar nature which have been produced in the past and which have involved the introduction into the asphalt layer of, for example, a roofing material such as roll roofing or cut shingles, of various forms of fibrous incombustible material such as mineral wool or slag wool.

More particularly the present invention is to be differentiated from the Parsons, Higgs, and Loos Patent No. 2,640,786. In the said patent, small pellets of mineral wool were used to prevent the excessive flow of asphalt from a shingle or the like when the same was subjected to fire heat, and it was either in an inclined or vertical position. It was found, however, that it required anywhere from 10 percent to 25 percent by weight of the asphalt coating to obtain the necessary degree of fire retarding effect.

In accordance with the present invention, however, it was found that by a suitable choice of an incombustible inorganic filament very much smaller amounts thereof could be employed. In order to enable this to be done, however, it was necessary to employ a filament which had a substantially uniform diameter throughout its length. Drawn glass filaments were found to be ideal for this purpose, because these, by being either gas drawn or mechanically drawn from a plastic or viscid mass of glas, inherently have a substantially uniform diameter. Such glass filaments are produced at the present time in enormous quantities and are spun into threads and woven into various fabrics, and are also used in the formation of very light-weight heat insulating materials. As a by-product from the above products there is available, also in enormous quantities, trimmings, waste and rovings which contain glass filaments of the desired sizes for the practice of the present invention.

In accordance with the teachings of this invention, it has been found that drawn glass filaments having a diameter not exceeding about 4 microns nor less than about ½ micron will effect unexpected fire-resisting properties when utilized in minute quantities in bituminous coatings. The length of the glass filaments is also critical and should not be less than about 3 millimeters, for otherwise the desired property of natural interfelting of the filaments will not be properly attained, although the presence of some fibers shorter than this is not to be precluded, provided only that a satisfactory interfelted mat can be obtained within the coating.

It has been found that the filament length may be considerably longer than 3 millimeters provided only that it is of such length that it can be properly incorporated with the asphalt coating. The fundamental principle upon which the present invention is based is the incorporation of the glass filaments in a bituminous coating applied to a base sheet, these filaments forming an interfelted mass within the coating. This base sheet may be the regular well-known type of asphalt-saturated roofing felt which is cellulosic in nature and which is inherently combustible, as is of course also the asphalt itself.

The basic fire resistance of the disclosed coating composition is effected by the presence therein of a skeleton of interfelted fine glass filaments which will enable the asphalt coating to intumesce or puff up, so that, even after the asphalt has burnt away, a crust will remain which will hold the flame from the body of the building for a considerable period of time. It has been found that, if the drawn glass filaments utilized for the formation of the skeleton have dimensions within critical ranges herein disclosed, small quantities of the filaments will effect fire resistance which is totally unexpected and on a par with the fire resistance effected by shingles rated in Class A by the Underwriters' Laboratories.

A preferred method is to prepare a mixture of the glass filaments with asphalt in suitable proportions and then to apply this to any asphalt-saturated base sheet either by rolling, doctoring, or by extrusion.

The eventual product will therefore consist of the following laminated but nondelaminatable structure:

There will first be the base sheet saturated with asphalt or similar bituminous material, then the layer of asphalt or the like containing the interlaced glass filaments, and finally a layer of mineral granules. The asphalt layer may be, if desired, applied in two separate operations, but of course by reason of the temperatures employed, these two applied layers will bond, and to all intents and purposes will form a single layer.

Referring now to the drawings, there is illustrated in Fig. 1 a form of the present invention showing a section through a building-covering material made in accordance with the present invention. A base sheet 5, consisting of cellulosic fibers such as are commonly used for this purpose, is saturated with asphalt in the well-known manner. Applied thereto is a layer 6 of coating asphalt in which there is uniformly disposed throughout interfelted glass filaments 7 having critical dimensions. There is then a layer 8 of further coating asphalt upon which there is superimposed the layer 9 of roofing granules 10 which are partly imbedded in the layer 8, but for the main part extend above the surface of it, to give the desired finished effect of this type of building-covering material.

It is to be understood that layers 6 and 8 may be just a single layer, in which case the fibers 7 will be distributed substantially uniformly through the combined layers 6 and 8.

One way of practicing the present invention is illustrated in Fig. 2, it being understood that this is entirely diagrammatical and with no attempt whatsoever to represent the relative sizes of the various equipment or to indicate by more than symbols the apparatus employed.

Inasmuch as the apparatus for making roofing felt and siding is very well known, this will adequately convey to those skilled in this art the procedural steps involving the novel process of the present invention. Thus a roofing felt 11, coming for example from a roll 12 thereof, is first passed through a mass 13 of molten saturating asphalt contained in a saturator 14, the felt passing for example underneath roller 15 so as to insure proper penetration of the saturant through the interstices of the felt 11. The felt may then pass into a usual type of looper 16 through which the material is carried to allow it to cool and for the saturant to equalize itself in the felt.

The saturated felt 11 then passes beneath a suitable extruder 18 which is fed with a mixture 20 of glass filaments and a bituminous material such as asphalt, the mixture being forced out of the discharge slot 22 of the extruder 18 by means of the power screw 24 so as to emerge from the slot 22 as a continuous thin sheet of substantially the same width as that of the roofing felt 11. This method of filament-asphalt mixture application makes possible good control of the operation and particularly the maintenance of the desired percentage composition of the glass filament-containing coating composition.

Another very satisfactory way of applying the plastic coating of asphalt containing the glass filaments is simply to apply it to the base sheet from a suitable supply tank and to adjust the thickness of the coating by a suitable doctor. As this method is a standard and well-known type of operation, it requires no illustration. The regular asphalt coating machines may readily be adapted to this operation.

Following the application of the glass filament-asphalt coat to the saturated felt 11, there is then applied, if desired, an additional coating 26 of asphalt 26a stored in receptacle 28. However, the asphalt coating 26, and receptacle 28 for the same, may be omitted, although it may be advantageous to use a doctor 30 to insure that the thickness of the applied filament-containing layer is of the right thickness.

Hopper 32 then deposits a separate layer of roofing granules on the upper surface of the asphalt coating layer 26, so as to form a final upper granule layer 34. Pressure rollers 36 and 38 serve to force these granules partly into the coating so as to secure their firm adhesion thereto.

It is to be understood, however, that there may be occasions in which a building-covering material may be desired which does not have mineral granules applied thereto, so the omission of the granules is to be considered as still within the scope of the present invention.

In this connection an important distinction must be kept in mind between the nature of the fibers which have been used by prior art workers in the attempt to produce a fire-retardant building-covering material, and those used in the present invention. Thus some workers have contented themselves with the use of various types of asbestos fibers, which were incorporated with the asphalt in varying proportions, running as high as 40% thereof. Such fibers, however, are of non-uniform diameter, usually being thicker at one end than the other. This is particularly true with the product known as mineral wool, which is produced by the blasting of a molten stream or streams of slag by means of steam or other gas. If one examines even well made mineral wool under a magnifying glass, it will be found that the fibers vary very greatly in diameter and are almost invariably somewhat curved and are usually cuneiform in cross section, and in many cases have little hooks and beads on them, all of which are quite undesirable for the present purpose.

As will be developed later in connection with the proportion of the materials to be employed, it will be found that by the use of the glass filaments of substantially uniform diameter and of an average length not less than about 3 millimeters, a sort of fabric is obtained which, although not actually woven, is ever so much more effective in keeping the flame of a fire from striking through to the roof. As the coating puffs up and intumesces the effect is enhanced.

It has been found that the following ranges of materials are effective for the present purpose:

Filament diameter from about ½ to about 4 microns;
Filament length about 3 millimeters and upward to as long as can be reasonably spread or incorporated with the asphalt;
Percentage filaments used from about ¼% to not exceeding about 5% based on the combined asphalt-filament wedge;
Coating asphalt from about 35% to 99%.

The length of the fibers may, of course, vary considerably in any coating composition, some being shorter than 3 millimeters, but the preponderant amounts thereof should not be lower than of that size.

Inasmuch as mineral fillers such as ground slate flour, sand, barytes, and the like are very commonly used in asphalt coating compositions, it will be evident that their use is to be considered as within the scope of the present invention, and for many purposes the presence of such fillers is advantageous not only because it serves as a substitute for the more expensive asphalt but also because it makes the coating more weather resistant.

When producing a roofing shingle of high fire resistance it is advisable to have about 45 or more pounds of coating per factory square, which is 108 square feet. If filler is to be used a very advantageous proportion is 55% of asphalt and 45% of a ground mineral filler of which ground limestone will serve as an illustrative example.

It has been found, for example, that as little as ¼% of the glass filaments will produce noticeable effects, but for most purposes from 2% to 4% based on the combined weight of the filament and asphalt components only is entirely satisfactory. The glass filaments may be initially in the form of roving, which is first cut into about 6 millimeter lengths, the fibers having a diameter of about 3 microns. The actual composition to be introduced into the extruder 18 may be as follows:

| | Percent |
|---|---|
| Asphalt | 70 |
| Ground filler (for instance, limestone) | 27 |
| Glass filament roving | 3 |

In compounding this material, it is advisable first to mix the filler with the hot molten asphalt and afterwards to introduce the cut glass filaments from the rovings, the mixture being sufficiently agitated to effect separation of the fibers from each other, but without undue shortening thereof. A mixture of this kind stood up extremely well when shingles made therewith were subjected to a standard fire test and by applying a flame to the shingles while supported on a 30° slope. While there was some running of the asphalt, this soon stopped and even though all the asphalt was burned away, there remained a substantially white webbing of the glass filaments. The effect may be likened to that of the burning away of the web from a freshly hung old-fashioned Welsbach gas mantle wherein the thorium oxide skeleton remains sufficiently cohesive to be brought to incandescence by the gas flame. While of course this skeleton in the shingle is of no great physical strength, yet it remains on the roof and, by being puffed up and hence out of physical contact with the felt, retards the flame from striking through the felt and igniting the roofing boards to which the shingle has been secured.

It is very advantageous to employ a glass filament which contains a certain amount of boron.

In a further example a filamentous glass fiber containing boron and having a fiber diameter of about 2 microns was used, the fiber having been obtained in the form of a light fluffy mat which was cut into small squares about 6 millimeters on each side before being mixed with the asphalt.

In a third example a resin-coated glass fiber was used which had been air-laid and was originally in the form of a mat about 1″ thick, the filaments having a diameter of about 3.5 microns. This mat was cut up into little squares about 6 millimeters on the side and the resulting pieces incorporated with asphalt in the various proportions, the amount varying from 1% to 3% and using a coating containing 70% of asphalt and 27% of filler, which, plus the 3% of the glass filaments, makes 100%. Other shingles were made in which the filler was 29% and the filaments 1% of the total composition.

It was found that about 4% of a 3.0 micron fiber results in the production of a shingle in which there was no cracking of the felt or striking through of the flame even after a one full hour exposure to a powerful Fischer burner applied to the surface of the shingle supported at an angle of 30°.

Other examples are given in tabular form and also show the results of the fire tests. In the subjoined table, it should be understood that the time to form a crack in the felt is to be construed as the time required to perceive a red glow from the back surface of the shingle, which surface is not directly contacting the flame.

| | 1 (Class A Shingle) | 2 | 3 | 4 | 5 | 6 | 7 | 8 | 9 | 10 | 11 |
|---|---|---|---|---|---|---|---|---|---|---|---|
| Composition (Percent by Weight): | | | | | | | | | | | |
| Asphalt | | 55 | 99.75 | 70 | 55 | 55 | 55 | 55 | 55 | 55 | 95.93 |
| Filler | | 45 | 0 | 29.75 | 44.72 | 44.45 | 44.95 | 43.9 | 43.3 | 42.1 | 0 |
| Glass Fibers | | | .25 | .25 | .28 | .55 | .55 | 1.1 | 1.7 | 2.9 | 4.07 |
| Average Fiber Diameters (Microns) | | | 2 | 2 | 2 | 3 | 2 | 3 | 3 | 3 | 3 |
| Fiber Length (mm.) | | | 5 | 5 | 13 | 13 | 5 | 13 | 13 | 13 | 13 |
| Percent Filament Based upon Asphalt and Fibers | | | .25 | .36 | .5 | 1 | 1.0 | 2.0 | 3.0 | 5.0 | 4.07 |
| Fire Test: | | | | | | | | | | | |
| Time to form a crack in the felt (Minutes) | 5:45 | 1:50 | 3 | 2:20 | 5:30 | 6:15 | 10 | 23 | 32 | 51 | 60+ |
| Length of Flow (Inches) | 3.5 | 6+ | 6+ | 3 | 6 | 2.5 | 1.75 | 1.25 | .25 | None | None |

It is apparent from the above table that a bituminous coating composition containing a very small percentage of glass filaments will effect a fire-resistant shingle which can be satisfactorily used in the production of roofs or siding. These shingles will be highly resistant to ignition by sparks and falling fire brands. The fire resistance afforded by the extremely small percentages of glass fibers in a roofing composition is startling and unexpected. This fire resistance, however, is owing to the small diameter range of from ½ to 4 microns which the applicants have found impart unexpected fire resistance, even though extremely small percentages of drawn glass filaments are used.

It will be noted from the above table that in shingle #3, as low as 0.25 of one percent of glass filaments having an average fiber diameter of 2 microns is sufficient to noticeably extend the cracking time. More important, it will be noted that all shingle compositions having at least one percent of glass filaments, shingles 7 through 11, have a filament diameter within the specified range ½ to 4 microns; these shingles also have a cracking time greater than that of a Class A shingle, shingle #1. The remaining shingles having the lesser percentages of glass filaments also possess cracking times superior to that of shingle 2.

From the above it is startling that the fire resistance imparted to a roofing composition containing such small percentages of drawn glass filaments will result in shingles comparable to or superior to that of a Class A shingle as tested above if the glass fiber filament diameter is of small magnitude.

The startling results of the above table are clear evidence that if the drawn glass filament diameter is of a small magnitude within the prescribed range, the small filament percentages disclosed in the various compositions above disclosed will produce shingles having fire resistance comparable to or superior to a Class A shingle.

It will also be understood that in the subjoined claims where the diameter and length of the fibers are given, that the length and diameter of the various individual filaments will of course vary. However, each filament will be substantially uniform in diameter from one end to the other; therefore, completely distinguishing it from natural asbestos or blown mineral wool or slag wool. For that reason, in the claims the diameter of the fibers is stated as being of a uniform diameter within the range of from about ½ to not more than about 4 microns, but this does not mean that all the filaments in a given coating must be of the same diameter. Although the drawn glass filament diameters in the shingles of the above table average 2 and 3 microns, glass filaments having diameters of from about ½ to about 4 microns are included therein. As previously mentioned, the minimum length of the glass filaments is about 3 millimeters and the maximum length is limited only by the inability of the fibers to properly admix with the asphalt and other shingle components.

It will be seen that the fibers may be in chunks or pellets, if desired, or in the form of loose strands when being mixed with the asphalt, as they will interfelt sufficiently for the purpose of the present invention as a result of the mixing required when blending it with the asphalt.

We claim:

1. A fire-retardant fiber-base building covering material comprising a base sheet of bitumen-impregnated webbing, a layer of a thermoplastic bituminous coating composition thereon containing from about one-half percent to not exceeding about five percent by weight of interfelted drawn glass filaments of an average length of not substantially less than about three millimeters, said latter percentage being based on the combined weight of said bituminous binder and glass filaments, the greater proportion of said filaments having a diameter within the range of from about one-half to not more than about four microns, and being not less than about three millimeters in length, said glass filaments defining a fabric in said bituminous coating.

2. A material as claimed in claim 1 in which the coating also contains a ground inorganic filler.

3. A material as claimed in claim 2 in which there is a top layer of roofing granules partly imbedded in and adhering to the coating layer.

4. Process of making a fire-retarding building covering material which comprises the step of applying to a bitumen-saturated base sheet a layer of a bituminous coating composition containing from about one-quarter percent to not substantially more than five percent by weight of interfelted drawn glass filaments of a length not substantially less than three millimeters, said latter percentage being based on the combined weight of said bituminous binder and glass filaments, each filament having a substantially uniform diameter within the range of from about one-half to not substantially more than about four microns.

5. Process of making a composite building covering material which comprises the steps of mixing molten asphalt with about one-quarter percent to not substantially more than five percent by weight of drawn interfelted glass filaments of an average length not substantially shorter than about three millimeters, said latter percentage being based on the combined weight of said bituminous binder and glass filaments, each fiber having a substantially uniform diameter within the range of about from one-half micron to about four microns, extruding the resulting mixture in the form of a very thin sheet and immediately applying it to a bitumen-saturated base sheet to effect its adhesion thereto, and adhering mineral roofing granules thereto.

6. Process of making a fire-retarding building covering material which comprises the step of applying to a bitumen-saturated base sheet a layer of a bituminous coating composition containing from about one-quarter percent to not substantially more than five percent by weight of interfelted drawn glass filaments of a length not substantially less than three millimeters, said latter percentage being based on the combined weight of said bituminous binder and glass filaments, each filament having a substantially uniform diameter within the range of from about one-half to not substantially more than about four microns, and adjusting the thickness of the bituminous coating composition on said bitumen-saturated base sheet.

References Cited in the file of this patent

UNITED STATES PATENTS

| | | |
|---|---|---|
| 2,326,723 | Fasold et al. | Aug. 10, 1943 |
| 2,549,017 | Saffir | Apr. 17, 1951 |
| 2,581,640 | Fasold et al. | Jan. 8, 1952 |
| 2,619,675 | Woolff | Dec. 2, 1952 |
| 2,751,962 | Drummond | June 26, 1956 |

FOREIGN PATENTS

| | | |
|---|---|---|
| 512,520 | Canada | May 3, 1955 |